United States Patent [19]

Rosman

[11] Patent Number: 4,761,953

[45] Date of Patent: Aug. 9, 1988

[54] HYDRAULIC ELEVATOR MECHANISM

[75] Inventor: Alan H. Rosman, Woodland Hills, Calif.

[73] Assignee: Dynamic Hydraulic Systems, Inc., Canoga Park, Calif.

[21] Appl. No.: 945,970

[22] Filed: Dec. 24, 1986

Related U.S. Application Data

[63] Continuation-in-part of Ser. No. 601,481, Apr. 18, 1984, Pat. No. 4,715,180, and a continuation-in-part of Ser. No. 570,590, Jan. 13, 1984, abandoned.

[51] Int. Cl.[4] .............................................. F16D 31/02

[52] U.S. Cl. ........................................ 60/414; 60/372; 60/429; 60/464; 60/486; 91/461

[58] Field of Search ................. 60/429, 464, 369, 371, 60/372, 381, 383, 414, 413, 486; 91/420, 461, 459

[56] References Cited

U.S. PATENT DOCUMENTS

| | | | |
|---|---|---|---|
| 2,582,556 | 1/1952 | Morey | 60/469 |
| 2,960,828 | 11/1960 | Gould | 60/429 X |
| 3,747,351 | 7/1973 | Wilkerson et al. | 91/420 X |
| 3,908,515 | 9/1975 | Johnson | 91/420 |
| 3,939,656 | 2/1976 | Goldfein | 60/464 X |
| 4,188,787 | 2/1980 | Bromell et al. | 60/416 X |
| 4,546,607 | 10/1985 | Kime | 60/372 |
| 4,631,918 | 12/1986 | Rosman | 60/372 |

*Primary Examiner*—Edward K. Look

*Attorney, Agent, or Firm*—Hopgood, Calimafde, Kalil, Blaustein & Judlowe

[57] ABSTRACT

The invention contemplates hydraulic-lift mechanism which employs a power integrator in the connection between a charged hydraulic accumulator and the actuator for a vertically positionable load; the power integrator, additionally, has a prime-mover connection, and the pressurized charge of the accumulator is advisedly set to fully accommodate a preselected level of average load upon the actuator. The hydraulic circuit importantly includes check valves, with a pilot-operated check valve interposed between the power integrator and the accumulator and another pilot-operated check valve interposed between the power integrator and the load actuator. The pilot-operated check valves cooperate with other check valves to assure automatic transfer of hydraulic fluid under pressure from the accumulator to the load actuator, and vice versa, as may be determined by selected control of or via the power integrator. The system of check valves also cooperates with pump action to assure that adequate fluid is drawn from a sump and is deliverable for pilot-operated functions; stated in other words, with minimum reliance upon the sump, the system provides maximum conservation of energy in effecting such transfer of pressurized fluid, from and to the accumulator, as may be involved in any controlled lift or descent of any load, within the capacity of the system.

14 Claims, 2 Drawing Sheets

HYDRAULIC ELEVATOR MECHANISM

RELATED CASE

This application is a continuation-in-part of copending application Ser. No. 601,481, filed Apr. 18, 1984, now U.S. Pat. No. 4,715,180 and said copending application is a continuation-in-part of original application Ser. No. 570,590, filed Jan. 13, 1984, now abandoned.

BACKGROUND OF THE INVENTION

The invention relates to hydraulic lift mechanism and in particular to such mechanism as is required to serve intermittent alternating vertical displacement of a load, wherein the load may be of various magnitudes within the capacity of the mechanism. Such conditions exist for hydraulically operated cranes and hoists such as fork lifts, and for hydraulic elevators.

Conventional electric-motor driven elevators are known as traction elevators. They rely on cable suspension of an elevator car from one side of a drive sheave at the upper end of the elevator shaft, with a counterweight suspended by the same cable from the other side of the drive sheave, the counterweight being designed to at least offset the weight of the car, so that theoretically the prime mover need only supply power adequate to handle loads up to the live-load capacity of the system. As a practical matter, however, such elevators must meet a requirement for fast initial acceleration from a dead start; this requirement calls for relatively high current-handling capacity so that the prime mover must be of substantially greater capacity, e.g., three times the capacity required to move the load after its initial acceleration to design running speed.

By contrast, the car of a conventional hydraulic elevator is at the upper end of an elongate vertical drive piston, operating in an elongate cylinder beneath the low end of the elevator shaft. There is no equivalent to the counterweight of a traction elevator. The prime mover for upward displacement of the car is an electric motor to drive a pump, for drawing hydraulic fluid from a sump reservoir and delivering the same via suitably controlled valve means to the head end of the cylinder; descent proceeds gravitationally via suitably controlled valve means in a throttling-flow connection to the sump from the head end of the cylinder. The net result is that prime-mover power must always be of sufficient capacity to elevate maximum load on the system, at specified conditions of speed and initial acceleration.

As far as I am aware, Bailey, U.S. Pat. No. 269,994 of 1883 is alone in suggesting that a hydraulic accumulator could serve to counterbalance a rotary pump-driven hydraulic-elevator system on the basis of an average live-load on the load-positioning hydraulic cylinder of the system. But Bailey's system was susceptible to irretrievable leaks (outside his system) via the reversibly driven gear pump he proposed to use between the accumulator and the load-positioning cylinder, so that if the elevator car were to assuredly hold stationary at a given floor-landing elevation, it would be necessary to close two shut-off valves, one on each side of the Bailey gear pump, in that the Bailey disclosure of an unillustrated brake to hold the pump cannot be a means to hold the car, due to the unavoidable leakage. Moreover, the Bailey disclosure provides no suggestion of means to replenish hydraulic fluid lost by leakage.

BRIEF STATEMENT OF THE INVENTION

It is an object of the invention to provide improved hydraulic lift-positioning mechanism of the character indicated, with great economy of prime-mover power, for a given system-load capacity.

A specific object is to achieve the above object in a fully hydraulic system which will hold a given selected load elevation and which thus obviates the need for auxiliary braking and/or shut-off devices.

It is also a specific object, particularly in the case of hydraulic-elevator systems, to provide hydraulic control mechanism meeting the above objects and adaptable, both to new installations and as a conversion of an installed existing system, the mechanism being adaptable to conventional electric controls, such as floor-directing buttons in the car and at floor landings, and multiple-speed operation including smooth acceleration from and deceleration in approach to floor levels.

A general object is to meet the above objects with simplified structure, at reduced overall initial expense, and inherently characterized by materially reduced operating cost.

The invention achieves the foregoing objects in hydraulic-lift mechanism which employs what I term a power integrator in the connection between a charged hydraulic accumulator and the actuator for a vertically positionable load; the power integrator, additionally, has a prime-mover connection, and the pressurized charge of the accumulator is advisedly set to fully accommodate a preselected level of average load upon the actuator. The hydraulic circuit importantly includes check valves, with a pilot-operated check valve interposed between the power integrator and the accumulator and another pilot-operated check valve interposed between the power integrator and the load actuator. The pilot-operated check valves cooperate with other check valves to assure automatic transfer of hydraulic fluid under pressure from the accumulator to the load actuator, and vice versa, as may be determined by selected control of or via the power integrator. The system of check valves also cooperates with pump action associated with rotation of the power integrator, to assure that adequate fluid is drawn from a sump and is deliverable for pilot-operated functions; stated in other words, with minimum reliance upon the sump, the system provides maximum conservation of energy in effecting such transfer of pressurized hydraulic fluid, from and to the accumulator, as may be involved in any controlled lift or descent of any load, within the capacity of the system.

A power integrator, as contemplated herein, is a rotary liquid-displacement device having two spaced flow-connection ports and an interposed rotor with externally accessible shaft connection to the rotor, and the expression "rotary" as used herein in connection with such a device is to be understood as including various known rotary-pump structures, such as gear-pump and sliding-vane devices, as well as axially reciprocating and radially reciprocating configurations, wherein rotor-shaft rotation is related to hydraulic flow into one port and out the other port. In other words, for purposes of the invention, such "rotary" devices provide for such hydraulic flow, and they provide for an external input/output torque-response relation to the hydraulic flow.

DETAILED DESCRIPTION

The invention will be illustratively described in connection with the accompanying drawings, in which.

Figure 1:
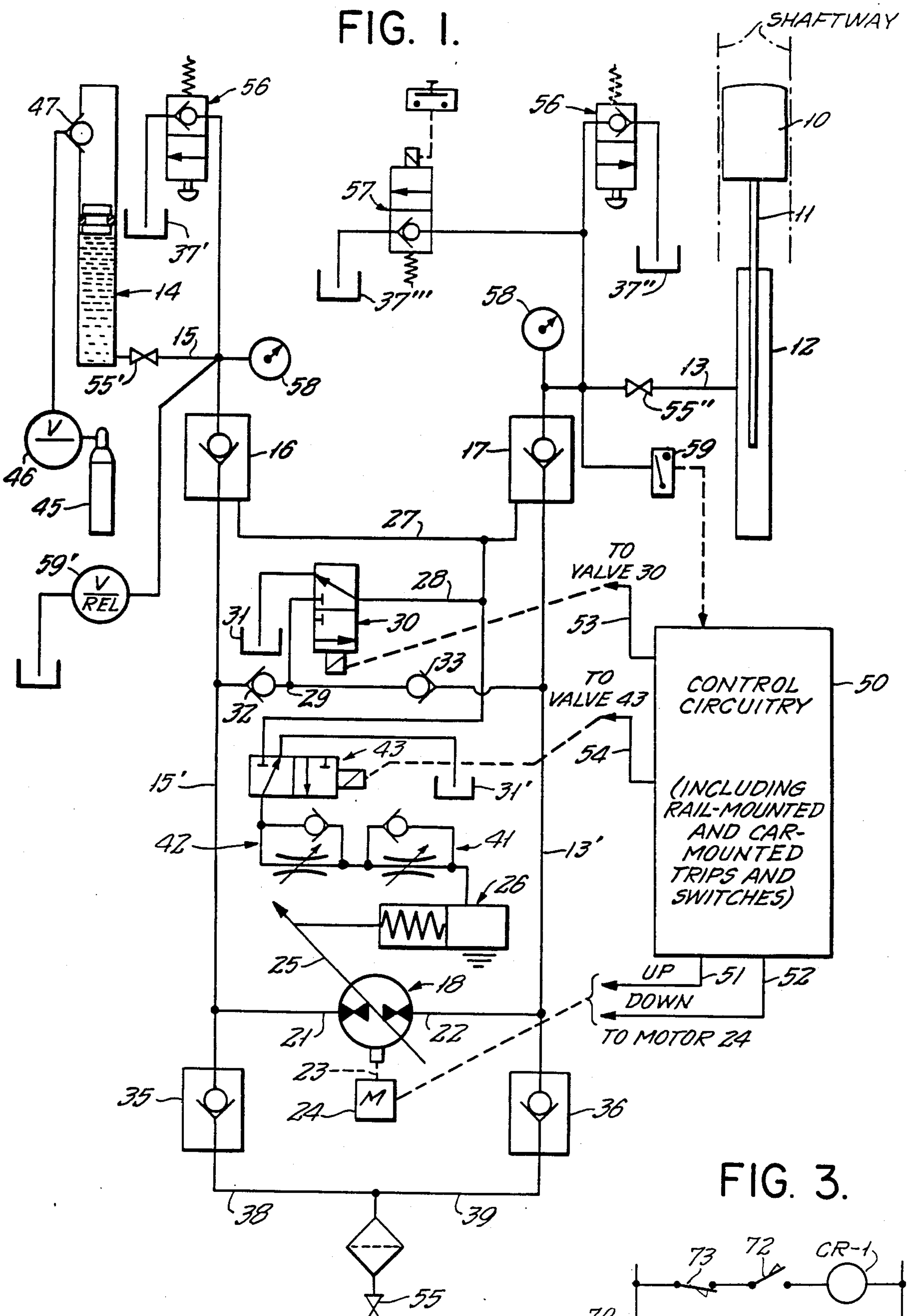
FIG. 1 is a hydraulic-circuit diagram schematically illustrating a hydraulic-elevator system embodying the invention, wherein the prime mover is reversible and the actuator is a conventional car-lifting cylinder.

Referring to FIG. 1, the invention is first illustratively shown in application to a hydraulic-elevator system wherein a car 10 will be understood to be suitably guided by rails (not shown) of a vertical shaft serving a plurality of floor-landing levels. As is conventional, car 10 receives its vertical displacement and positioning from below via the upper end of an elongate ram (piston) 11 and fixed cylinder 12, with pressurized hydraulic fluid therefor being provided via a line connection 13 to cylinder 12. But from this point on, all similarity to conventional hydraulic drive and control ceases.

In accordance with the invention, a charged hydraulic accumulator 14 is employed as a "counterweight", continuously operative upon fluid in line 13 to cylinder 12 to effectively balance the dead load of car 10 and piston 11, plus a selected live-load magnitude which is selected to be intermediate zero live load and full-rated live load, and generally one half the full-rated live load. More specifically, a line 15 for hydraulic flow to or from accumulator 14 is connected to the line 13 for hydraulic flow from or to cylinder 12 via pilot-operated check valves 16–17 oriented to check hydraulic flow from accumulator 14 and from cylinder 12 respectively, in the absence of a pilot-operated opening of one or the other of these valves 16–17; and a power integrator 18 is interposed between lines 15'–13' served by the respective check valves 16–17. The power integrator 18 is a rotary-displacement device having first and second flow-connection ports 21–22, to which lines 15'–13' are respectively connected, and an interposed rotor has externally accessible shaft connection 23 to a prime mover such as a reversible electric motor 24. In the arrangement of FIG. 1 (see arrow 25), and as described in detail in said patent applications, the power integrator 18 is desirably a variable flow device, wherein variation in flow is a function of piston displacement of a hydraulic actuator 26.

At present, it is preferred that pilot opening of the respective check valves 16–17 be in response to a single actuating pressure. Thus, a line 27 establishes parallel connection of the respective pilots of check valves 16–17, and the circumstance of sufficient hydraulic pressure in a control line 28 is operative to dislodge both check valves 16–17 from their normally closed condition; this pilot actuation necessarily follows, since both of the check valves 16–17 are strongly urged to closed condition by existing hydraulic pressure at both ends (13,15) of the system. This line-28 control connection additionally includes a solenoid-operated valve 30 which is normally positioned to discharge pressure fluid in line 28 to sump, symbolized at 31, but which is solenoid-actuable to enable pressure fluid in either of the integrator-port lines 13'–15' to pass via line 28 for concurrent pilot-driven opening of both check valves 16–17, there being isolation check valves 32–33 (connected back-to-back at 29 to valve 30) to assure integrity of the described pilot-operating connection 28.

Two further check valves 35–36, in separate lines 38–39 of connection from a reservoir or sump 37 to the respective port connections 21–22 of the power integrator, are operative to assure an initial supply of hydraulic fluid to the power integrator, no matter what the initial direction of drive from motor 24; specifically, each of the check valves 35–36 is oriented to check or block any flow in the direction of reservoir 37. It will be understood that reservoir 37 receives collections from all sumps (e.g., including sump 31) shown in the drawing, via means not shown.

Recital of important operating components is completed, at least for purposes of initial description of typical hydraulically controlled operation, by identifying at 41–42 separately adjustable throttling orifices for respectively smoothly accelerating and smoothly decelerating drive to car 10, pursuant to operation of a solenoid valve 43 via cam-operated limit-switch functions normally available for controlled smooth departure from and approach to a given level of elevator landing; such limit-switch devices and their operation are not necessary to an understanding of the present invention and are therefore not shown in FIG. 1.

A brief operating description may now be given for the circuit of FIG. 1, which will be recalled is an illustration of a first mode of use of the invention, namely involving a variable-flow power integrator (18) in combination with a reversible (bidirectionally operable) electric motor (24) as the prime mover.

Initially, one may assume a filled system wherein car 10, its load and piston (ram) 11 are locked at a particular floor level, by reason of ram pressure in line 13 forcing closure of check valve 17; and it will be understood that a charge of pressurized gas (e.g., nitrogen) will have been supplied (as from a commercial container 45, via a throttle valve 46 and a check valve 47) to the upper end of accumulator 14 over an adequate volume of hydraulic fluid, the gas pressure being retained by check valve 47 and the hydraulic outlet 15 of the accumulator being blocked and held, by forced closure of check valve 16. Even though the live load may have changed at the floor level, the accumulator pressure against check valve 16 and the ram pressure against check valve 17 will be very nearly the same, being slightly greater at check valve 17 if the live load happens to be greater than average, and being slightly greater at check valve 16 if the live load happens to be less than average. By contrast, pressure on the other sides of check valves 16–17 will have been relieved, first, by the normal (i.e., unactuated) state of valve 30 wherein pilot-operating pressure in line 28 is vented to sump 31, and by the normal (i.e., unactuated) state of valve 43 wherein the volumetric-rate control actuator 26 is vented to sump 31' as the compressionally loaded spring of actuator 26 returns integrator control 25 to a near-zero volumetric-rate setting; secondly, unavoidable minor leakage at the shaft seal of integrator 18 (e.g., to sump 37 via a drain connection, not shown) will have relieved pilot-actuating pressures in lines 13' and 15'.

Let it be assumed that car 10 is to be raised from a lower landing to an upper landing. For this purpose, conventional electrical-control circuitry 50 will be available, the same being understood to include car-mounted and landing-mounted button controls whereby appropriately directional excitation is supplied (via an UP control line 51) to motor 24, causing integrator 18 to function as a low-volume pump of hydraulic fluid into port 21 and out of port 22. The suction involved in such pump action immediately and for a brief instant draws an increment of hydraulic fluid from reservoir 37 via line 38 and its associated check valve 35. This action is brief and the drawn increment is small because lines 13′–15′ were already full, so that the drawn increment quickly builds pilot-operating pressure via line 13′; at the same time, the control circuitry 50 will be understood to provide a solenoid-operating signal in a line 53 to valve 30, whereby pilot-operating pressure in line 13′ is delivered via lines 28–27 to both check valves 16–17, thus opening both check valves 16–17. Once only partially opened, check valve 16 admits full accumulator pressure to line 15′, thereby closing check valve 35 and presenting accumulator pressure to port 21 of the integrator; similarly, when check valve 17 begins to open, full ram (load) pressure is established in line 13′, thereby assuring continued closure of check valve 36 and presenting ram pressure to port 22 of the integrator.

Once motor 24 and valve 30 are actuated, both check valves 16–17 are held open, allowing port 21 to assume instantaneous accumulator pressure and port 22 to assume instantaneous ram pressure. Motor 24 continues to run, because hydraulic fluid must be displaced from the accumulator to the ram cylinder 12 in the desired process of elevating car 10 and its contents. If the live load in car 10 is less than average, accumulator pressure at port 21 will exceed ram pressure at port 22, so that accumulator pressure alone will be sufficient for upward displacement of car 10; in this event, the fluid-displacement response of the rotor of integrator 18 will develop a torque by which motor 24 becomes a generator, feeding a quantum of electrical energy back into the supply grid. If on the other hand, the live load is greater than average, motor 24 will remain a prime mover for pump action in the integrator, raising inlet accumulator pressure at port 21 to a greater level at port 22 while also displacing a driving flow of hydraulic fluid from the accumulator to the ram cylinder.

It has been indicated that at the start of motor 24, integrator 18 was at its low-volume rate setting, in that actuator 26 had been vented to sump 31′. This, of course, means that initial car movement was slow (smooth initial acceleration). To then achieve faster running speed for the car, the control circuitry 50 will be understood to include a further control line 54 connected for actuation of valve 43 at predetermined short time delay after motor start and after actuation of valve 30. Once valve 43 is actuated, metering orifice 41 becomes determinative of the rate at which accumulator pressure (in line 28) can drive actuator 26 to a full volumetric setting (25) of integrator 18, at which point of course car 10 is being propelled at maximum speed; this rate of actuating displacement at 26 will be understood to be determinative of smoothness of acceleration of car speed. In like fashion, upon approach to the selected upper level of car landing, conventional switch and/or trip devices (comprehended by the control circuitry 50) will be understood to terminate the signal in line 54, thus deactivating valve 43 and allowing fluid to bleed from actuator 26 to sump 31′ at a rate determined by the orifice setting at 42; in such case, smooth deceleration is achieved in approach to the destination landing level, as the compression spring of actuator 26 discharges fluid and restores the volumetric-control setting 25 to the low-volume condition of the integrator 18.

It will be seen that in the described upward travel of car 10, accumulator 14 acted as a counterweight, and that torque needed at or generated by the rotor shaft of the integrator was a function of the instantaneous difference in pressure at ports 21–22. The power required of motor 24 is primarily a function of the desired maximum flow of hydraulic fluid (oil). Thus, for the case of a typical car 10 having a deadweight of 2500 pounds and a rated live-load capacity of 5000 pounds, the accumulator setting (charge pressure, regulated at 46) is preferably set to balance the car with half the rated live load. In this circumstance, and for a maximum desired car speed of 120 ft/min, there is at most a 7-horsepower requirement of motor 24, and this is to be compared with the 25 horsepower required of a conventional hydraulic elevator having the same conditions of load capacity and travel speed.

For downward travel of car 10 from an upper-floor level to a lower-floor level, operation is similar to the described upward movement, although motor 24 is excited for rotation in the reverse direction, through a control signal via line 52 from the control circuitry, calling for fluid displacement through the integrator in the direction from port 22 to port 21. An increment of hydraulic fluid is initially and quickly drawn from reservoir 37 via line 39 and its check valve 36, allowing pump action at 18 to build pressure in line 13′ to at least match accumulator pressure; at the same time, a travel-start signal in line 53 will have actuated valve 30, so that built-up pressure in line 15′ can be delivered via line 28 for a pilot-driven opening of both check valves 16–17. Ram pressure thus is applied via line 13′ to what is now the inlet port 22 of integrator 18, and port 21 becomes the outlet via which integrator 18 returns hydraulic fluid to the accumulator. Motor 24 will consume electric energy from the supply grid, or it will return electrical energy to the supply grid, depending upon the sign of the difference between pressures at ports 21–22.

The previous description with respect to smooth acceleration from starting level and smooth deceleration on approach to the selected lower destination applies equally for the involved descent, with orifices at 41–42 governing the respective rates of displacing actuator 26 in the speed-increasing and speed-decreasing directions, as the same are the reflection of adjusted increase and decrease in the volumetric capacity of integrator 18.

The described circuit will slowly lose its content of hydraulic fluid, due to unavoidable oil leakage, which is preferably gravitationally returned to a reservoir, as to sump 37. Such leakage, however slight and however slow, requires the hydraulic system to have a replenishing mode, which is preferably automatic and governed by a sensor (not shown) of hydraulic level in the system. For example, the circuitry 50 may include means for starting motor 24 (via line 52) in the DOWN direction, said means being responsive to a sensed need for replenishment and temporarily disabling any actuation of the drive-start valve 30. In that event, motor 24 causes integrator 18 to pump replenishing fluid from reservoir 37 (via check valve 36), into line 15′ and thence into the accumulator (via check valve 16) until the sensor indicates that desired replenishment has been completed, whereby the control circuitry to valve 30 is restored to operability, and the system is fully reconditioned. The above-noted kind of replenishment system is further discussed in connection with FIG. 3; and an alternative system is discussed in connection with FIG. 6 of said patent applications.

Other components of the circuit of FIG. 1 will be recognized for their safety and/or maintenance purposes. For example, manual shut-off valves (stops) at 55–55′–55″ enable isolation of control components from hydraulic fluid at reservoir 37, at accumulator 14, and at ram cylinder 12, respectively. Manually operated drainage to reservoir (sump) 37 is available via valves 56 (accumulator side) and 56′ (ram side) via local sump receptors 37′–37″, and push-button operation of a solenoid valve 57 enables a jogged emergency descent of car 10 through jogged release of ram pressure and fluid to a sump receptor 37‴; a pressure-responsive switch 59 responds to a detected overload condition in the ram cylinder, to deliver a "stop-operations" command signal to the control circuitry 50. Pressure indicators at 58–58′ enable accumulator and ram pressures to be continuously observable, the indicator 58 being also used when operating valve 46 to charge the accumulator with gas to a predetermined pressure level. And pressure relief for accumulator pressure is available via a sump-connected relief valve 59′.

Figure 2:
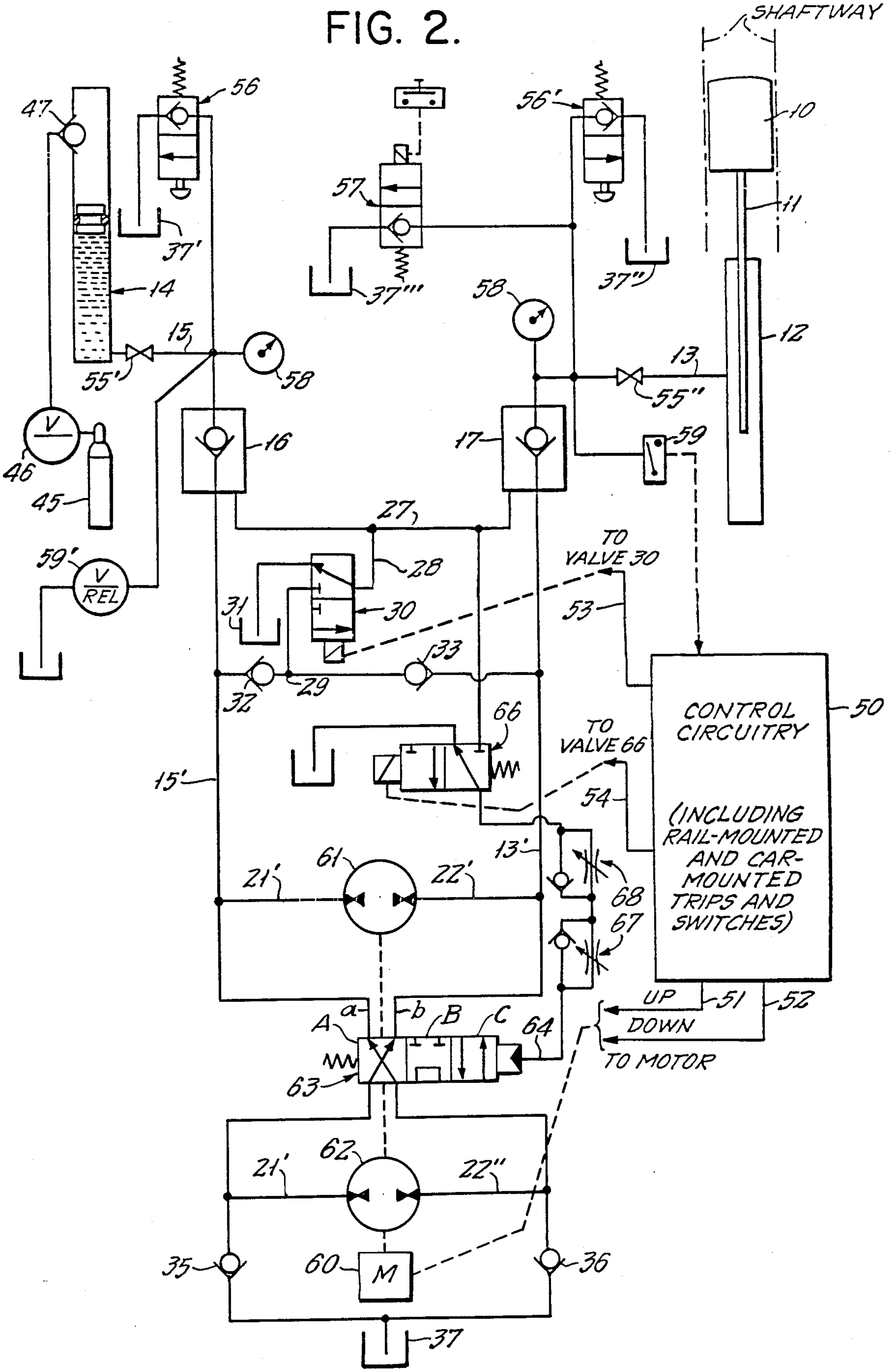
FIG. 2 is a similar diagram to show another embodiment.

In the embodiment of FIG. 2, a reversible electric motor 60, suitably a squirrel-cage motor, is the means of essentially constant-speed driving the rotors of two power integrators 61–62 on a single shaft. Each of these integrators delivers constant flow for the direction in which it is driven. The power integrator 61 has a greater liquid-displacement capacity (e.g., 50 gallons/minute) than that of power integrator 62 (e.g., 40 gallons/minute), and the respective ports 21′–22′ of power integrator 61 are connected (via line 15′) to the accumulator 14 and (via line 13′) to the lift actuator 12 in the manner described for integrator 18 of FIG. 1. On the other hand, the respective ports 21″–22″ of the power integrator 62 communicate with lines 13′–15′ only via a distributor valve 63, which is biased to a first positional state (A) in which flow from integrator 62 is directionally opposite to that from integrator 61, thereby determining a controlled relatively slow rate of flow between accumulator 14 and actuator 12. Distributor valve 63 is also pressure-responsive via a control line 64 to effect displacement, against bias, to a second positional state (B) in which flow from integrator 62 is directionally the same as that from integrator 61, thereby determining a controlled relatively fast rate of flow between accumulator 14 and actuator 12.

In the form shown, the shiftable element of distributor valve 63 includes a third positional state (C), intermediate the first and second positional states (A, B). For convenience in FIG. 2, the ports of distributor valve 63 are identified at a and b, which are respectively connected to the lines 15′–13′ directly served by integrator 61; the two further ports c and d of valve 63 are respectively connected to the ports 21″–22″ of the lower-capacity integrator 62. For the biased at-rest position of valve 63, the first positional state A is operative to reverse the integrator-62 flow with respect to that of integrator 61; for the pressure-operated second positional state B, valve 63 additively connects the two integrator (61, 62) flows; and for the intermediate positional state C, valve 63 interconnects ports c and d, thereby locally recycling integrator-62 flow while blocking integrator-62 flow to either of lines 15′ or 13′. Preferably, valve 63 is sufficiently lapped so that transition between slow-flow rate (positional state A) and fast-flow rate (positional state B) is effectively smoothed at entrance into and departure from the intermediate positional state C, for any given direction of operation of the distributor valve 63.

The pressure fluid used to actuate the distributor valve 63 via line 64 may be taken by a tap 65 to the pressure-fluid line 27 which serves for operation of the pilot-operated check valves 16–17. And for a purpose which will later be described, a solenoid valve 66 is interposed between tap 65 and the line connection 64 to the distributor valve 63. In its normal unactuated state, solenoid valve 66 blocks pressure-fluid connection to the distributor valve, while permitting drainage to sump of such fluid as is expelled upon spring-bias return of the distributor-valve member to its positional state A; to avoid shock on such an occasion, a variable orifice 67 assures a sufficiently slow drainage to sump. In the solenoid-actuated state of valve 66, pressure-fluid communication is open via lines 65–64 to the distributor valve, calling for its pressure-responsive displacement at a relatively slow rate, as governed by an interposed variable orifice 68.

Let it be assumed that the system is filled with hydraulic fluid, except for the pressurized-gas volume of the accumulator, and that all valves 30–63–66 are in their deactivated state (as shown in FIG. 2), with car 10 at a first elevation from which it is to be raised to a higher elevation. A control signal from means 50 via line 51 will determine and initiate directional rotation of both integrators 61–62 in the direction for an upward displacement of actuator 12; at the same time, another control signal in line 54 from means 50 will actuate valve 30 to the position in which hydraulic pressure in either of lines 13′–15′ will operate valves 16–17 to open condition, at which point full accumulator pressure and ram (12) pressure are operative to hold the open condition of valves 16–17. Initially, due to distributor valve 63 in its A position, the transfer of hydraulic fluid from the accumulator to actuator 12 will be at the slow flow attributable substantially to the difference between the respective integrator flows. Initial acceleration of car 10 is thus gradual. At a predetermined delay thereafter, as timed at 50, a control signal in line 54 actuates solenoid valve 66 to impose fluid pressure from line 27 upon the pressure-responsive means of distributor valve 63, with resultant slow displacement thereof through its intermediate region C and to its B position, the slow pace of this shift being as determined by the setting of orifice 68. Once the B position is achieved, the car 10 travels at full speed, which is maintained until attaining a predetermined offset short of the predetermined destination level. At this offset, the control signal in line 54 ends, so that pressure fluid between valves 63 and 66 can drain at the slow rate determined by the setting of orifice 67, while distributor valve 63 is allowed to respond to springbias action, back to the A condition which determines slow fluid delivery to actuator 12. At achieving the predetermined floor level, control means 50 is operative to de-energize both motor 60 and the solenoid valve 30, thus allowing both check valves 16–17 to close, with valve 17 retaining the car-elevated condition.

A descent mode of operation of the described circuit of FIG. 2 will follow the same sequence, except that motor 60 will be driven via control line 52 for operations in the DOWN direction.

In a modification of the circuit described for FIG. 2, and preferably, the motor 60 is not only reversible but it is also excitable for a selected one of two speeds, e.g., a squirrel-cage motor having optional running speeds of 3600 or 1800 r.p.m. With such a motor, the control circuitry 50 will be understood to provide timing and excitation sequencing which utilizes motor-speed change and hydraulic-fluid flow-rate change as coacting, sequentially operative automatic means of comfortably accelerating and decelerating car 10 in any given passage from one to another floor level. Thus, for an illustrative such passage, floor departure is initiated by starting motor 60 at high speed, with distributor valve 63 in its A position and with actuation of solenoid valves 30–66 as previously described; shortly after floor departure, e.g., after 1 or 2 seconds, solenoid valve 66 is actuated to shift the hydraulic flow to full speed. However, upon approach to the destination level, and at a first offset from the destination level, solenoid valve 66 is de-energized for a first phase of deceleration, as valve 66 returns to its A position; thereafter, at second and closer offset from the destination level, motor 60 is shifted to its slower speed in the same direction, for a creeping final approach to the destination level. A passage in the opposite direction will again be understood to involve the same sequence of operations, except for running motor 60 in the opposite direction.

Reference has been made previously to all sumps draining to the lowermost sump 37, as well as to system replenishment means which is automatically operative to return sump accumulated fluid to the hydraulic accumulator. It has been noted above that, quite aside from the technique described in connection with FIG. 6 of said copending patent applications, the systems of FIG. 1 and FIG. 2 are each inherently adapted to perform this function, using a simple control-interlock feature within means 50, the interlock feature being schematically illustrated by the fragmentary ladder diagram of FIG. 3.

Figure 3:
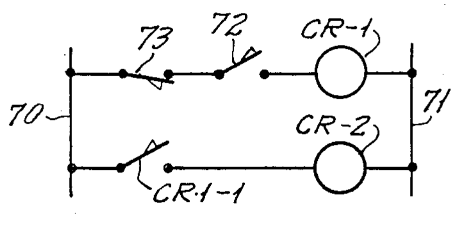
FIG. 3 is a fragmentary diagram to show part of an electric-control circuit.

In FIG. 3, the operative control voltage between lines 70–71 will be understood to be determined by a contact (not shown) of a control relay (not shown) within control circuitry 50 and determining excitation of motor 24 (60) in the descent-drive direction. In this condition, operative voltage exists across series-connected elements comprising a control-relay winding CR-1, a normally open switch 72 (which may be a float-operated switch which responds to sump (37) level, to close at a predetermined upper limit and to open at a predetermined lower limit), and a normally closed switch 73 which interlocks with a main car-starting switch, being closed only if car 10 has achieved a destination level, with check valves 16–17 in closed condition. Should the float switch contact 72 close while car 10 is in passage from one to another level, switch 73 will be open, thus precluding operation of control relay CR-1. However, once such a destination has been safely reached, switch contact 73 will close to complete the circuit for excitation of relay CR-1, thereby, at a second ladder level closing the normally open contacts CR-1-1 of this relay and exciting a second relay CR-2 which will be understood to energize the motor 24 (60) for drive control in line 52 in the DOWN direction. Such DOWN-direction drive of the motor, without energizing either of solenoid valves 30–66 will mean that integrators 61–62 deliver a low net flow rate which is powerless to change the closed (and level-locking condition) of check valve 17, but which can only be operative to draw fluid from sump 17, via check valve 36, for forced restorative feed back to the accumulator side of the system, via check valve 16. This restorative action proceeds until the sump-level monitoring switch contacts 72 open, thus de-energizing control relays CR-1 and CR-2, and stopping the restorative-pump action at the predetermined switch-opening lower level of hydraulic fluid in the sump. Since the difference in float levels determining the closed/open condition of contacts 72 is small, the time required for a given such incremental replenishment operation is short, and certainly well within the approximately 10-second interval involved in door-opening and closing operations which are necessarily involved at any given car-floor elevation. And for the short time that such replenishment action is proceeding, it will be understood that second, normally closed, contacts (not shown) of relay CR-1 will be open to foreclose any car movement during replenishment proceedings.

What is claimed is:

1. In a hydraulically operated lift system wherein a pressurized hydraulic accumulator is continuously connected to a single-acting hydrualic lift actuator and wherein a rotary liquid-displacement device is interposed between the accummulator and the actuator, said rotary-displacement device having two flow-connection ports and an interposed rotor with externally accessible shaft connection to the rotor, the improvement in which said rotary liquid-displacement device is the first of two rotary liquid-displacement devices and has a greater flow-rate capacity than the second of said devices, a first pilot-operated check valve interposed between said accumulator and said devices, a second pilot-operated check valve interposed between said actuator and said devices, said check valves being operative in closed condition to check flow from said accumulator and to check flow from said actuator, fluid-pressure operated means responsive to liquid displacement by said rotary devices and connected to both of the respective pilots of said check valves, whereby regardless of the net direction of liquid displacement by said devices, both pilot-operated check valves will be opened by pilot action and will remain open, and fluid pressure will be applied to both of the respective pilots of said pilot-operated check valves, during all lift and descent operations of said system; distributor-valve means having first and second ports respectively connected to the accumulator and to the actuator, said valve means having third and fourth ports respectively connected to the flow-connection ports of the second of said devices; said distributor-valve means having a first positional state in which one flow is between the first and third ports while another flow is between the second and fourth ports, said distributor valve having a second positional state in which one flow is between the first and fourth ports while another flow is between the second and third ports; and a prime mover drive connection to both of said devices; whereby for one of said positional states, flow between said accumulator and said actuator represents substantially the sum of the capacities of said devices and for the other of said positional states, flow between said accumulator and said actuator represents substantially the difference between the capacities of said devices.

2. The improvement of claim 1, in which said prime mover is a reversible electric motor.

3. The improvement of claim 1, in which said fluid-pressure means includes a solenoid valve having a first position in which pilot-operating pressure fluid is delivered to the pilots of said check valves and a second position in which pilot-operating pressure fluid between said solenoid valve and said check valves is relieved.

4. The improvement of claim 1, in which said prime mover is a reversible electric motor that is selectively operable at first relatively high and second relatively low speeds.

5. The improvement of claim 1, in which said distributor valve traverses an intermediate state in moving from one to the other of said positional states, and in said intermediate state flow is solely between said third and fourth ports so as to transiently recirculate second-device flow while isolating second-device flow from communication with either said accumulator or said lift actuator.

6. The improvement of claim 11, in which said distributor valve is lapped for smooth transition of flow changes in the course of movement between said positional states.

7. In a hydraulically operated lift system wherein a pressurized hydraulic accumulator is continuously connected to a single-acting hydraulic lift actuator and wherein a rotary liquid-displacement device is interposed between the accumulator and the actuator, said rotary-displacement device having two flow-connection ports and an interposed rotor with externally accessible shaft connection to the rotor, the improvement in which said rotary liquid-displacement device is the first of two rotary liquid-displacement devices and has a greater flow-rate capacity than the second of said devices, a first pilot-operated check valve interposed between said accumulator and said devices, a second pilot-operated check valve interposed between said actuator and said devices, said check valves being operative in closed condition to check flow from said accumulator and to check flow from said actuator, fluid-pressure operated means responsive to liquid displacement by said rotary devices and connected to both of the respective pilots of said check valves, whereby regardless of the net direction of liquid displacement by said devices, of said pilot-operated check valves may be opened by direct hydraulic-displacement action and the other of said pilot-operated check valves will be opened by said pressure both pilot-operated check valves will be opened by pilot action and will remain open, and fluid pressure will be applied to both of the respective pilots of said pilot-operated check valves, during all lift and descent operations of said system; distributor-valve means having first and second ports respectively connected to the accumulator and to the actuator, said valve means having third and fourth ports respectively connected to the flow-connection ports of the second of said devices; said distributor-valve means having a first positional state in which one flow is between the first and third ports while another flow is between the second and fourth ports, said distributor valve having a second positional state in which one flow is between the first and fourth ports while another flow is between the second and third ports; and a prime mover drive connection to both of said devices; whereby for one of said positional states, flow between said accumulator and said actuator represents substantially the sum of the capacities of said devices and for the other of said positional states, flow between said accumulator and said actuator represents substantially the difference between the capacities of said devices; said distributor-valve means including biasing means continuously urging the same to the other of said positional states and said distributor-valve means including pressure-responsive means connected to said fluid-pressure means for shifting the same to said one positional state.

8. The improvement of claim 7, in which the fluid-pressure connection to said pressure-responsive means includes a throttling orifice.

9. The improvement of claim 7, in which the fluid-pressure connection to said pressure-responsive means includes a solenoid valve, whereby the timing of pressure-operated shifting of said distributor valve may be electrically controlled.

10. The improvement of claim 9, in which said second solenoid valve has a first position in which fluid-pressure means responsive to motor rotation is connected to said pressure-responsive means and a second position in which pressure fluid is relieved between said solenoid valve and said pressure-responsive means.

11. The improvement of claim 9, in which said prime mover is a reversible electric motor that is selectively operable at first relatively high and second relatively low speeds, and control circuitry including first means for starting and stopping said moptor, second means for determining the direction of rotation of said motor, and third means for determining a shift from one to the other of said speeds; said control means being operative to start said motor for a given direction at relatively high speed and with a delay therafter to operate said solenoid valve, thereby initiating a change in positional state of said distributor valve from the differential-flow state to the summation state only after lapse of said delay; said control means being further operative to change motor speed from relatively high to relatively low upon approach to a predetermined elevation and to deenergize said motor at predetermined elevation.

12. The improvement of claim 1 or claim 7, in which said fluid-pressure operated means comprises connected back-to-back check valves in separate lines of connection to the respective ports of said greater-capacity rotary-displacement device, a pressure-fluid connection including a solenoid valve between the back-to-back connection and the respective pilots of said pilot-operated check valves, said solenoid valve having one state determining admission of piot-operating fluid pressure to said pilots and another state determining relief of pilot-operating fluid pressure, and control means governing said solenoid valve in said one state during rotation of said rotary devices and in said other state in the absence of rotation of said devices.

13. In a hydraulically operated elevator system wherein a pressurized hydraulic accumulator is continuously connected to a single-acting hydraulic cylinder for lift/descent positioning of an elevator car at different selected floor levels and wherein a rotary liquid-displacement device is interposed between the accumulator and the cylinder, said rotary-displacement device having two flow-connection ports and an interposed rotor with externally accessible shaft connection to the rotor, the improvement wherein a first pilot-operated check valve is interposed between the accumulator and one of said ports, a second pilot-operated check valve interposed between the cylinder and the other of said ports, a sump for collection of leakage of hydraulic fluid, a reversible electric motor for reversibly driving said rotor, means including a first check valve connected to draw fluid from said sump to one of said ports and a second check valve connected to draw fluid from said sump to the other of said ports while blocking fluid flow from either of said ports to said sump; a pressure-fluid connection to the pilots of said pilot-operated check valves, said pressure-fluid connection comprising a solenoid valve having one state determining admission of pilot-operating fluid to said pilots and another state determining relief of pilot-operating fluid to sump, said pressure-fluid connection further including back-to-back check valves in separate lines of connection to the respective ports of said rotary-dispacement device, and electrical control means including selectively operable first means for controlling the direction of motor rotation and for determining said one state of said solenoid valve, whereby said car will be in UP or DOWN motion as determined by the direction of motor rotation, said control means further including second means responsive to sump level for determining only the DOWN direction of motor rotation and for determining the other state of said solenoid valve, whereby sump fluid may be returned to the accumulator end of said system only when said car is not in motion.

14. The improvement of claim 13, in which the first means and the second means of said control means are electrically interlocked to prevent their concurrent operation.

* * * * *